United States Patent [19]

Maruyama et al.

[11] Patent Number: 4,686,265

[45] Date of Patent: Aug. 11, 1987

[54] PROCESS FOR POLYMERIZATION OF OLEFINS

[75] Inventors: Kouji Maruyama; Takeshi Nomura; Hiroshi Ueno; Naomi Inaba, all of Saitama, Japan

[73] Assignee: Toa Nenryo Kogyo Kabushiki Kaisha, Tokyo, Japan

[21] Appl. No.: 868,000

[22] Filed: May 29, 1986

Related U.S. Application Data

[60] Division of Ser. No. 768,924, Aug. 23, 1985, Pat. No. 4,613,581, which is a continuation of Ser. No. 564,789, Dec. 22, 1983, abandoned.

[30] Foreign Application Priority Data

Dec. 28, 1982 [JP] Japan .................................. 57-227488
Dec. 28, 1982 [JP] Japan .................................. 57-227489

[51] Int. Cl.$^4$ ............................................... C08F 4/64
[52] U.S. Cl. ...................................... 526/125; 526/124; 526/348.5; 526/348.6; 526/352

[58] Field of Search .................................. 526/124, 125

[56] References Cited

U.S. PATENT DOCUMENTS

| | | | |
|---|---|---|---|
| 4,232,139 | 11/1980 | Minami et al. ................. | 526/124 X |
| 4,329,253 | 5/1982 | Goodall et al. ................ | 526/125 X |
| 4,464,478 | 8/1984 | Scata et al. .................... | 526/125 X |

*Primary Examiner*—Patrick P. Garvin
*Attorney, Agent, or Firm*—M. B. Kurtzman

[57] ABSTRACT

A process for polymerizing one or more alpha-olefins in the presence of a catalyst system comprising (A) a solid titanium containing catalyst component said component prepared by contacting a magnesium alkoxide, a halogenated hydrocarbon, an electron donor and a titanium compound with one another, and (B) an organoaluminum cocatalyst. In preferred embodiments, the magnesium alkoxide is first contacted with a magnesium halide. The solid titanium containing compound can be treated with an organoaluminum compound.

13 Claims, No Drawings

PROCESS FOR POLYMERIZATION OF OLEFINS

This is a division of application Ser. No. 768,974, filed 8/23/85 and now U.S. Pat. No. 4,613,581 which is a continuation of Ser. No. 564,789 filed 12/22/83 and now abandoned.

The present invention relates to a catalyst component for polymerization of olefins. More particularly, it relates to a catalyst component which permits one to produce olefin homopolymers or copolymers of high bulk density in high yields.

BACKGROUND TECHNOLOGY

Heretofore, there has been generally known a catalyst component containing a titanium compound as a catalyst for homopolymerization of olefins such as ethylene and for copolymerization of ethylene and alpha-olefin. In order to increase the activity of this catalyst, or in order to increase the catalytic efficiency per unit quantity of titanium in the catalyst component, several attempts have been made to contact a titanium compound with a treated metal compound such as a magnesium compound.

Such attempts include a process in which an oxygen-containing compound of magnesium is reacted with a halogenating agent and then the reaction product is contacted with a titanium halide (Japanese Patent Laid-open No. 8395/1972), a process in which a hydroxyl group-containing magnesium compound and a magnesium alkoxide are copulverized and then the resulting product is contacted with a titanium halide (Japanese Patent Publication No. 34098/1971), a process in which a magnesium halide, a magnesium alkoxide, and a titanium halide are copulverized (Japanese Patent Laid-open No. 80383/1976), and a process in which a magnesium halide and a titanium compound are copulverized and then the resulting product is reacted with a titanium tetrahalide (Japanese Patent Laid-open No. 151011/1980).

The polymerization catalyst prepared from a catalyst component obtained by the above-mentioned process is improved in catalytic activity; but there are still some problems unsolved. They are: (1) the resulting polymer is low in bulk density and this decreases the productivity of the polymerization reactor; (2) the catalytic activity considerably decreases where polymerization takes a long time; (3) hydrogen as a molecular weight modifier becomes less effective, and a high hydrogen partial pressure or a high polymerization temperature is required if it is necessary to increase the melt index of the polymer; (4) the reactivity is low in copolymerization with other olefin as a comonomer, and a high comonomer concentration is required; and (5) copolymers cannot be produced in high yields, because the bulk density of copolymer decreases and solvent-soluble low-molecular weight polymer is formed in large quantities, when the comonomer content in copolymer is increased to lower the density of copolymer.

DISCLOSURE OF INVENTION

Object of Invention

In order to solve the above-mentioned problems, particularly the problems involved in the production of olefin copolymers, for example, copolymers of ethylene and alpha-olefin, the present inventors carried out extensive researches, which led to the findings that the homopolymerization of an olefin and the copolymerization of an olefin and other olefin proceed effectively, when a solid component (I) is used as a catalyst component in combination with an organoaluminum compound, said solid component (I) being obtained by contacting (i) a magnesium alkoxide preferably contacted with a magnesium halide, (ii) a halogenated hydrocarbon, (iii) an electron donor compound, and a (iv) titanium compound with one another. In another aspect of the invention said solid component (I) is contacted with an organoaluminum compound to provide solid component (II).

SUMMARY OF THE INVENTION

The gist of this invention resides in (1) a catalyst component (I) for polymerization of olefins which is prepared by contacting (i) magnesium alkoxide preferably contacted with a magnesium halide, with (ii) a halogenated hydrocarbon, (iii) an electron donor compound, (iv) and a titanium compound with one another, and (2) a catalyst component (II) for polymerization of olefins which is prepared by contacting an organoaluminum compound with solid component (I).

Raw Materials for Catalyst Component

The raw materials used for preparing the catalyst component of this invention are described below.

(1) Magnesium Alkoxide

The magnesium alkoxide used in this invention is represented by the formula Mg(OR) (OR'), where R and R' are alkyl, alkenyl, cycloalkyl, aryl, or aralkyl groups having 1 to 20 carbon atoms, preferably 1 to 10 carbon atoms, and R and R' may be the same or different.

These compounds include, for example, $Mg(OCH_3)_2$, $Mg(OC_2H_5)_2$, $Mg(OCH_3)(OC_2H_5)$, $Mg(Oi-C_3H_7)_2$, $Mg(OC_3H_7)_2$, $Mg(OC_4H_9)_2$, $Mg(Oi-C_4H_9)_2$, $Mg(OC_4H_9)(O-iC_4H_9)$, $Mg(OC_4H_9)-(Osec-C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, and $Mg(OCH_2C_6H_5)_2$.

These magnesium alkoxides should preferably be dried before use, and more preferably be dried with heating under reduced pressure. After drying, they should preferably be crushed.

(2) Magnesium Halide

Preferred magnesium halides are magnesium dihalides such as magnesium chloride, magnesium bromide, and magnesium iodide. Particularly preferable among them is magnesium chloride.

These magnesium halides are advantageously used in the form of powder having an average particle diameter of about 1 to 50$\mu$. Powder of larger particle diameter can also be used.

These magnesium halides should preferably be anhydrous one which contains substantially no water of crystallization. Commercial products should preferably be heated at 200° to 600° C. in the presence of an inert gas such as nitrogen, or heated at 100° to 400° C. under reduced pressure, before their use. However, this is not mandatory.

(3) Halogenated Hydrocarbon

The halogenated hydrocarbon used in this invention is a mono- and polyhalogen substitute of saturated or unsaturated aliphatic, alicyclic, or aromatic hydrocarbon having 1 to 12 carbon atoms. Examples of aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propylchloride, 1,2-dichloropropane, hexachloropropylene, octachloropropane, decabromobutane, and chlorinated paraffin. Examples of alicyclic compounds include chlorocyclopropane, tetrachlorocyclopentane, hexachloropentadiene, and hexachlorocyclohexane. Examples of aromatic compounds include chlorobenzene, bromobenzene, o-dichlorobenzene, p-dichlorobenzene, hexachlorobenzene, hexabromobenzene, benzotrichloride, and p-chlorobenzotrichloride. These compounds may be used individually or in combination with one another.

(4) Titanium Compound

The titanium compound used in this invention is a compound of divalent, trivalent, or tetravalent titanium. Examples of these compounds include titanium tetrachloride, titanium tetrabromide, trichloroethyoxytitanium, trichlorobutoxytitanium, dichlorodiethyoxytitanium, dichlorodibutoxytitanium, dichlorodiphenoxytitanium, chlorotriethyoxytitanium, chlorotributoxytitanium, tetrabutoxytitanium, and titanium trichloride. Preferable among them are tetravalent titanium halides such as titanium tetrachloride, trichloroethoxytitanium, dichlorodibutoxytitanium, and dichlorodiphenoxytitanium. Particularly preferable is titanium tetrachloride.

(5) Electron Donor Compound

The electron donor compound used in this invention includes carboxylic acids, carboxylic esters, alcohols, ethers, ketones, amines, amides, nitriles, aldehydes, alcoholates, phosphoamides, thioethers, thioesters, carbonic esters, and compounds of phosphorus, arsenic, or antimony attached to an organic group through a carbon or oxygen atom. Preferable among them are carboxylic esters, alcohols, and ethers.

Examples of carboxylic esters include butyl formate, ethyl acetate, butyl acetate, ethyl acrylate, ethyl butyrate, isobutyl isobutyrate, methyl methacrylate, diethyl maleate, diethyl tartrate, ethyl cyclohexanecarbonate, ethyl benzoate, ethyl p-methoxybenzoate, methyl p-methylbenzoate, ethyl p-tert-butylbenzoate, dibutyl phthalate, diallyl phthalate, and ethyl alpha-naphthoate. They are not limitative. Preferable among them are alkyl esters of aromatic carboxylic acid, particularly $C_{1-8}$ alkyl esters benzoic acid or nucleus-substituted benzoic acid such as p-methylbenzoic acid and p-methoxy benzoic acid.

The alcohols are represented by the formula ROH, where R is an alkyl, alkenyl, cycloalkyl, aryl, or aralkyl group of carbon number 1 to 12. Examples of the alcohols include methanol, ethanol, propanol, isopropanol, butanol, isobutanol, pentanol, hexanol, octanol, 2-ethylhexanol, cyclohexanol, benzyl alcohol, and allyl alcohol.

The ethers are represented by the formula ROR', where R and R' are alkyl, alkenyl, cycloalkyl, aryl, or aralkyl groups of carbon number 1 to 12, and R and R' may be the same or different. Cyclic ethers can also be used. Examples of the ethers include diethyl ether, diisopropyl ether, dibutyl ether, diisobutyl ether, diisoamyl ether, di-2-ethylhexyl ether, diallyl ether, ethyl allyl ether, butyl ally ether, diphenyl ether, anisole, ethyl penyl ether, tetrahydrofuran, and 1,4-dioxane.

(6) Organoaluminum Compound

The organoaluminum compound used in this invention is represented by the formula $R_nAlX_{3-n}$, where R is an alkyl group or aryl group, X is a halogen atom, alkoxy group, or hydrogen atom, n is an arbitrary number in the range of $1 \leq n \leq 3$. Preferred ones are alkyl aluminum compound and a mixture thereof or complex thereof having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohydride. Examples of such compounds include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum, diethyl aluminum bromide, diethyl aluminum iodide, and diisobutyl aluminum chloride; monoalkyl aluminum dihalide such as methyl aluminum dichloride, ethyl aluminum dichloride, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among them is dialkyl aluminum monohalide, particularly diethyl aluminum chloride. The dialkyl aluminum monohalide can be used in combination with another organoaluminum compound such as commercially available triethyl aluminum, triisobutyl aluminum, ethyl aluminum dichloride, ethyl aluminum sesquichloride, diethyl aluminum ethoxide, and diethyl aluminum hydride, and a mixture or complex thereof.

Preparation of Catalyst Component

The catalyst component of this invention is a solid component I which is obtained by contacting magnesium alkoxide or preferably a contact product of magnesium alkoxide and magnesium halide (referred to as the magnesium contact product hereinafter), a halogenated hydrocarbon, an electron donor compound, and a titanium compound with one another, and a solid component II obtained by further contacting the solid component I with an organoaluminum compound.

In what follows, the process for preparing the magnesium contact product is described.

The contacting of a magnesium alkoxide and a magnesium halide is accomplished by mixing and stirring both or by mechanically copulverizing both in the presence or absence of an inert hydrocarbon.

The inert hydrocarbon includes hexane, heptane, octane, cyclohexane, benzene, toluene, and xylene.

One mole of magnesium alkoxide is contacted with 0.1 to 10 moles, preferably 0.3 to 2.0 moles, of magnesium halide. In the case where the contacting is accomplished in the presence of an inert hydrocarbon, the hydrocarbon should preferably be used in an amount of 1 to 100 g for 100 g of the total quantity of magnesium alkoxide and magnesium halide.

The contacting of a magnesium alkoxide and a magnesium halide should preferably be accomplished at normal temperature to 200° C. for 0.1 to 100 hours in the case of mechanical copulverizing, and at normal temperature to 200° C. for 1 to 100 hours in the case of mixing and stirring in the presence of said hydrocarbon. Contacting by mechanical copulverizing is preferred. Mechanical copulverizing may be accomplished by using a grinder, such as rotary ball mill, vibratory ball mill, and impact mill, which is commonly used to obtain powders. The copulverizing may be accomplished under reduced pressure or in an inert gas atmosphere, in the substantial absence of moisture and oxygen, as occasion demands.

The magnesium alkoxide or the magnesium contact product obtained as described above is then contacted with a halogenated hydrocarbon, an electron donor compound, and a titanium compound. The contacting is accomplished by any one of the following methods:

(1) The magnesium alkoxide or magnesium contact product is contacted with a halogenated hydrocarbon, and then the resulting contact product is contacted with an electron donor compound, and finally the resulting contact product is contacted with a titanium compound.

(2) The magnesium alkoxide or magnesium contact product is contacted with an electron donor compound, and then the resulting contact product is contacted with a halogenated hydrocarbon, and finally the resulting contact product is contacted with a titanium compound.

(3) The magnesium alkoxide or magnesium contact product is contacted with a halogenated hydrocarbon, and then the resulting contact product is contacted with a titanium compound, and finally the resulting contact product is contacted with an electron donor compound.

(4) The magnesium alkoxide or magnesium contact product is contacted with a halogenated hydrocarbon and an electron donor compound simultaneously, and then the resulting contact product is contacted with a titanium compound.

(5) The magnesium alkoxide or magnesium contact product is contacted with a halogenated hydrocarbon and a titanium compound simultaneously, and then the resulting contact product is contacted with an electron donor compound.

(6) The magnesium alkoxide or magnesium contact product is contacted with a halogenated hydrocarbon, and then the resulting contact product is contacted with an electron donor compound and a titanium compound simultaneously.

(7) The magnesium alkoxide or magnesium contact product, a halogenated hydrocarbon, an electron donor compound, and a titanium compound are contacted with one another simultaneously.

Preferable among the above methods are (1) to (5). They are explained in the following.

Method (1)

(1) Contacting the magnesium alkoxide or magnesium contact product with a halogenated hydrocarbon:

The contacting of the magnesium alkoxide or magnesium contact product with a halogenated hydrocarbon is accomplished by mechanically copulverizing or merely stirring a solid or slurry mixture of the magnesium alkoxide or magnesium contact product and a solid or liquid halogenated hydrocarbon. Contacting by mechanical copulverizing is preferable.

The halogenated hydrocarbon may be selected from the above-mentioned compounds. Preferable among them is a polyhalogenated product of hydrocarbon having 2 or more carbon atoms. Examples of such compounds include 1,2-dichloroethane, 1,1,2-trichloroethane, 1,1,2-trichloroethylene, 1,1,2,2-tetrachloroethane, 1,2,2,2-tetrachloroethane, pentachloroethane, hexachloroethane, 1,2-dichloropropane, hexachloropropylene, octachloropropane, and hexachlorobenzene.

The magnesium alkoxide or magnesium contact product is contacted with a halogenated hydrocarbon in the ratio of 1 mole of magnesium alkoxide to 0.01 to 20 moles, preferably 0.1 to 2.0 moles, of the halogenated hydrocarbon. Mechanical copulverizing may be accomplished by using a grinder, such as rotary ball mill, vibratory ball mill, and impact mill, which is commonly used to obtain powders. The copulverizing may be accomplished under reduced pressure or in an inert gas atmosphere, in the substantial absence of moisture and oxygen, as occasion demands.

The contacting may be accomplished at 0° to 200° C. for 0.5 to 100 hours in the case of mechanical copulverizing, and at 0° to 200° C. for 0.5 to 100 hours in the case of mere stirring.

(2) Contacting with an electron donor compound:

The contact product of the magnesium alkoxide or the magnesium contact product and a halogenated hydrocarbon (referred to as contact product (1)-1 hereinafter) is then contacted with an electron donor compound. The contact product (1)-1 may be washed with a proper cleaning agent such as the above-mentioned inert hydrocarbon, before being contacted with an electron donor compound.

The contacting of the contact product (1)-1 with an electron donor compound may be accomplished by bringing them together as they are, but may be accomplished in the presence of an inert hydrocarbon and/or halogenated hydrocarbon. Contacting may be accomplished by mixing and stirring both, or by mechanically copulverizing both.

The inert hydrocarbon includes saturated aliphatic, saturated alicyclic, and aromatic hydrocarbons of carbon number 6 to 12 such as hexane, heptane, octane, cyclohexane, benzene, toluene, and xylene. (The inert hydrocarbons denote these compounds in the following description.) The halogenated hydrocarbon is selected from the compounds used in the contacting with the above-mentioned relevant contact product.

The ratio of contacting product (1)-1 with an electron donor compound is one mole of magnesium alkoxide to 0.001 to 10 moles, preferably 0.01 to 5 moles, of electron donor compound.

In the case where the contacting is accomplished by mixing and stirring in the presence of a hydrocarbon, the hydrocarbon should preferably be used in such an amount that the solid substance in the contact system is 10 to 300 g for 1 liter of the liquid substance. The contact temperature is 0° to 200° C., preferably 20° to 150° C., and the contact time is 0.1 to 20 hours, preferably 0.5 to 10 hours. In the case of mechanical copulverizing, the hydrocarbon should preferably be used in an amount of 1 to 100 g for 100 g of the contact product (1)-1. In this case, the contact temperature is normal temperature to 200° C. and the contact time is 0.1 to 100 hours.

The contacting with an electron donor compound in the absence of hydrocarbon should preferably be accomplished by mechanical copulverizing. In this case, the preferred contact temperature is normal temperature to 200° C. and the contact time is 0.1 to 100 hours.

(3) Contacting with a titanium compound:

The contact product of the magnesium alkoxide on the magnesium contact product and a halogenated hydrocarbon and an electron donor compound (referred to as contact product (1)-2 hereinafter) is then contacted with a titanium compound. The contact product (1)-2 may be washed with a proper cleaning agent such as the above-mentioned inert hydrocarbon before being contacted with a titanium compound.

The contacting of the contact product (1)-2 with a titanium compound may be accomplished by bringing them together as they are, but may be accomplished in the presence of a hydrocarbon and/or halogenated hydrocarbon. Contacting may be accomplished by mixing and stirring both, or by mechanically copulverizing both.

The hydrocarbon includes saturated aliphatic, saturated alicyclic, and aromatic hydrocarbons of carbon number 6 to 12 such as hexane, heptane, octane, cyclohexane, benzene, toluene, and xylene. The halogenated hydrocarbon is selected from the compounds used in the contacting with the above-mentioned relevant contact product.

The ratio of contacting the contact product (1)-2 with a titanium compound is one gram atom of magnesium in the contact product (1)-2 to 0.1 gram mol or more, preferably 1 to 5 gram mol, of titanium compound.

In the case where the contacting is accomplished in the presence of hydrocarbon and/or halogenated hydrocarbon, the contacting should be performed at 0° to 200° C. for 0.5 to 20 hours, preferably at 60° to 150° C. for 1 to 5 hours.

The hydrocarbon should preferably be used in such an amount that the contact product (1)-2 is 10 to 300 g for 1 liter of liquid substance (hydrocarbon and/or liquid halogenated hydrocarbon and liquid titanium compound).

The contact product (1)-2 may be contacted with a titanium compound twice or more under the above-mentioned contact conditions.

Method (2)

(1) Contacting the magnesium alkoxide or magnesium contact product with an electron donor compound:

The contacting of the magnesium alkoxide or magnesium contact product with an electron donor compound is accomplished by mixing and stirring or by mechanically copulverizing them in the presence or absence of an inert hydrocarbon, in the same way as used in the above-mentioned method (1)-2.

The magnesium alkoxide or magnesium contact product is contacted with an electron donor compound in the ratio of 1 mole of magnesium alkoxide to 0.001 to 10 moles, preferably 0.01 to 5 moles, of the electron donor compound.

In the case of contacting by mixing and stirring in the presence of an inert hydrocarbon, the hydrocarbon should preferably be used in such an amount that the solid substance in the contact system is 10 to 300 g per 1 liter of the liquid substance. In this case, the contact temperature is 0° to 200° C., preferably 20° to 150° C., and the contact time is 0.1 to 20 hours, preferably 0.5 to 10 hours. In the case of contacting by mechanical copulverizing, the hydrocarbon should preferably be used in an amount of 1 to 100 g for 100 g of the relevant contact product. In this case, the contact temperature is normal temperature to 200° C. and the contact time is 0.1 to 100 hours. In the case of contacting with an electron donor compound in the absence of hydrocarbon, the use of mechanical copulverizing is preferred. In this case, the contact temperature is normal temperature to 200° C. and the contact time is 0.1 to 100 hours.

(2) Contacting with a halogenated hydrocarbon:

The contacting of the contact product of the magnesium alkoxide or magnesium contact product and an electron donor compound (referred to as the contact product (2)-1 hereinafter) with a halogenated hydrocarbon is accomplished by mechanically copulverizing or by merely stirring a solid or slurry mixture of the contact product (2)-1 and a solid or liquid halogenated hydrocarbon, in the same way as used in the above-mentioned method (1)-1. Contacting by mechanical copulverizing is preferred. The contact product (2)-1 may be washed with a proper cleaning agent such as inert hydrocarbon before being contacted with a halogenated hydrocarbon.

The contact product (2)-1 is contacted with a halogenated hydrocarbon in the ratio of 1 mole of magnesium alkoxide in the contact product (2)-1 to 0.01 to 20 moles, preferably 0.1 to 20 moles, of the halogenated hydrocarbon. The contact temperature and contact time should preferably be the same as those in the above-mentioned method (1)-1.

(3) Contacting with a titanium compound:

The contact product of the magnesium alkoxide or magnesium contact product, an electron donor compound, and a halogenated hydrocarbon should preferably be carried out in the same way as in the above-mentioned method (1)-3.

Method (3)

(1) Contacting the magnesium alkoxide or magnesium contact product with a halogenated hydrocarbon:

The contacting of the magnesium alkoxide or magnesium contact product with a halogenated hydrocarbon is accomplished in the same way as in the above-mentioned method (1)-1.

(2) Contacting with a titanium compound:

The contacting of the contact product obtained in the above step (1) with a titanium compound is accomplished in the same way as in the above-mentioned method (1)-3.

(3) Contacting with an electron donor compound:

The contact product obtained in the above step (2) (referred to as the contact product (3) hereinafter) is then contacted with an electron donor compound. This contacting is accomplished by mixing and stirring or by mechanical copulverizing in the presence or absence of inert hydroarbon and/or halogenated hydrocarbon.

The ratio of contacting the contact product (3) with an electron donor compund is 1 gram atom of titanium in the contact product (3) 0.01 to 10 moles, preferably 0.02 to 5 moles, of electron donor compound.

In the case where the contacting is accomplished by mixing and stirring in the presence of a hydrocarbon and/or halogenated hydrocarbon, the hydrocarbon should preferably be used in such an amount that the solid substance in the contact system is 10 to 300 g for 1 liter of the liquid substance. In this case, the contact temperature is 0° to 200° C., preferably 20° to 150° C., and the contact time is 0.1 to 20 hours, preferably 0.5 to 10 hours. In the case of mechanical copulverizing, the hydrocarbon should preferably be used in an amount of 1 to 100 g for 100 g of the contact product (3). In this case, the preferred contact temperature is normal temperature to 200° C. and the contact time is 0.1 to 100 hours.

The contacting with an electron donor compound in the absence of the hydrocarbon should preferably be accomplished by mechanical copulverizing. In this case, the preferred contact temperature is normal temperature to 200° C. and the contact time is 0.1 to 100 hours.

The contact product with an electron donor compound may further be contacted with a titanium compound according to the above-mentioned method (1)-3.

Method (4)

(1) Contacting the magnesium alkoxide or magnesium contact product, a halogenated hydrocarbon, and an electron donor compound with one another:

The contacting of the magnesium alkoxide or magnesium contact product, a halogenated hydrocarbon, and an electron donor compound with one another is accomplished by mixing and stirring them or by mechanically copulverizing them in the presence or absence of inert hydrocarbon. The ratio of contacting the magnesium alkoxide or magnesium contact product, a halogenated hydrocarbon, and an electron donor compound should be such that the halogenated hydrocarbon is 0.01 to 20 moles, preferably 0.1 to 2.0 moles, and the electron donor compound is 0.001 to 10 moles, preferably 0.01 to 5 moles, for 1 mole of magnesium alkoxide.

In the case of contacting by mixing and stirring in the presence of hydrocarbon, the hydrocarbon should preferably be used in such an amount that the solid substance in the contact system is 10 to 300 g per 1 liter of the liquid substance. In this case, the contact temperature is 0° to 200° C., preferably 20° to 150° C., and the contact time is 0.1 to 20 hours, preferably 0.5 to 10 hours. In the case of mechanical copulverizing, the hydrocarbon should preferably be used in an amount of 1 to 100 g for 100 g of the solid substance. In this case, the preferred reaction temperature is normal temperature to 200° C., and the contact time is 0.1 to 100 hours.

The contacting of the three in the absence of the hydrocarbon should preferably be accomplished by mechanical copulverizing. In this case, the preferred contact temperature is normal temperature to 200° C. and the contact time is 0.1 to 100 hours.

(2) Contacting with a titanium compound:

The contact product of the magnesium alkoxide or magnesium contact product, a halogenated hydrocarbon, and an electron donor compound is contacted with a titanium compound. This contacting is accomplished in the same way as in the above-mentioned method (1)-3.

Method (5)

(1) Contracting the magnesium alkoxide or magnesium contact product, a halogenated hydrocarbon, and a titanium compound simultaneously:

The simultaneous contacting of the magnesium alkoxide or magnesium product, a halogenated hydrocarbon, and a titanium compound is accomplished by mechanically copulverizing them or by mixing and stirring them in the presence or absence of inert hydrocarbon such as hexane, heptane, octane, cyclohexane, benzene, toluene, and xylene.

The ratio of the magnesium alkoxide or magnesium contact product, a halogenated hydrocarbon, and a titanium compound is the same as that in the above-mentioned method (3). That is, the halogenated hydrocarbon is 0.01 to 20 moles, preferably 0.3 to 2.0 moles, and the titanium compound is 0.1 and more, preferably 1 to 5 moles, for 1 mole of magnesium alkoxide. The contact temperature is 0° to 200° C., preferably 20° to 150° C., and the contact time is 0.5 to 100 hours, preferably 1 to 50 hours.

In the case of contacting in the presence of hydrocarbon, the hydrocarbon should preferably be used in such an amount that the solid substance in the contact system is 10 to 300 g per 1 liter of the liquid substance.

(2) Contacting with an electron donor compound:

The contact product of the magnesium alkoxide or magnesium contact product, a halogenated hydrocarbon, and a titanium compound is contacted with an electron donor compound. This contacting is accomplished in the same way as in the above-mentioned method (3)-3.

The solid substance containing no liquid substance obtained as mentioned above is used as such as the catalyst component (solid component I) of this invention; and the solid substance containing a liquid substance obtained as mentioned above is used, after separation of the liquid substance, as the catalyst component (solid component I) of this invention. As occasion demands, it may be washed with an inert hydrocarbon, followed by drying, or dispersed into an inert hydrocarbon. The slurry is used as such for the polymerization of olefin, or contacted with an organoaluminum compound.

The solid component I of this invention is powder having a specific surface area of 100 to 650 $m^2$ g as measured by BET method at the adsoprtion temperature of liquid nitrogen, and having an average pore radius of 5 to 20 Å. It is composed of 10 to 20 wt % of magnesium atom, 1 to 15 wt % of titanium atom, 40 to 65 wt % of halogen atom, 1 to 20 wt % of electron donor compound, and organic compounds. Moreover, it contains a small quantity of halogenated hydrocarbon and/or derivatives thereof used in the preparation of the solid component I.

Contacting with an Organoaluminum Compound

According to this invention, the solid component I obtained in the above-mentioned method is contacted with an organoaluminum compound to prepare the catalyst component (solid component II) of this invention.

The contacting of solid component I with an organoaluminum compound is accomplished by mixing and stirring them or by mechanically copulverizing them in the presence or absence of inert hydrocarbon. The organoaluminum compound is selected from the above-mentioned ones. Preferred ones are trialkyl aluminum and dialkyl aluminum halide. The ratio of the solid component I to the organoaluminum compound is such that the organoaluminum compound is 0.05 to 10 gram mol, preferably 0.1 to 5 gram mol, for 1 gram atom of titanium in the solid component. In the case where contacting is accomplished by mixing and stirring in the presence of an inert hydrocarbon, the solid component I is used in an amount of 10 to 300 g, preferably 10 to 200 g, for 1 liter of the inert hydrocarbon. The contact temperature is −30° to 150° C., preferably −20° to 100° C. In this case, the contacting is accomplished by slowly adding a prescribed quantity of organoaluminum compound to solid component I over 1 minute to 10 hours, preferably 5 minutes to 5 hours. Subsequently, stirring is continued for 0.1 to 20 hours, preferably 0.5 to 10 hours. If they are contacted with each other in a short time less than 1 minute, the solid component I breaks into fine particles, making difficult the subsequent preparation of solid component. Moreover, this solid component forms a large quantity of olefin polymer in the form of fine powder which adversely affects the physical properties and productivity of the polymer. In the case where contacting is accomplished by mechanical copulverizing, it is desirable to use 1 to 100 g of inert hydrocarbon for 100 g of solid component I. In this case, the preferred contact temperature is normal temperature to 100° C. and the preferred contact time is 5 minutes to 2 hours.

In the case where contacting is accomplished without using an inert hydrocarbon, contacting by mechanical copulverizing is preferred. In this case, the preferred contact temperature is normal temperature to 100° C. and the preferred contact time is 5 minutes to 2 hours.

The contacting of solid component I with an organoaluminum compound may be performed in the presence of an olefin. In such a case, the contacting by mixing and stirring in the presence of an inert hydrocarbon is preferable. The olefin includes ethylene, propylene, 1-butene, 1-pentene, 1-hexene, 4-methyl-1-pentene, and 1-octene and other alpha-olefins. They may be used individually or in combination with one another. Contacting with an olefin prevents the catalyst component from being broken into fine particles by an organoaluminum compound. Moreover, it increases the mechanical strength of the catalyst component, preventing the catalyst component from becoming fine particles during its handling and, in turn, preventing the formation of polymer in the form of fine powder.

The contacting with an olefin can be accomplished by contacting the solid component I with an organoaluminum compound and then with an olefin, or by contacting the solid component I with an olefin and then with an organoaluminum compound.

The ratio of the solid component I to the organoaluminum compound is the same as that in the case where contacting with an olefin is not performed. Olefin is used in an amount of 0.01 to 10 g for 1 g of solid component I. The contact time for olefin varies according to the quantity of olefin used, the contact temperature, and the contact pressure of olefin. It is usually 1 minute to 48 hours. The contact temperature for olefin is 0° to 80° C., preferably normal temperature to 65° C. Contacting with an olefin may be accomplished in the presence of hydrogen.

The catalyst component (solid component II) of this invention is prepared as mentioned above. The solid component II which has been obtained by contacting with an organoaluminum compound without using an inert hydrocarbon may be used as such as the catalyst component for olefin polymerization; and the solid component II which has been obtained by contacting with an organoaluminum compound in the presence of an inert hydrocarbon may be used, after separation from the hydrocarbon, or in the form of slurry without separation, as the catalyst component for olefin polymerization. As occasion demands, it may be washed with an inert hydrocarbon, followed by drying, before being used for olefin polymerization.

The catalyst component prepared by contacting with an organoaluminum compound may be used for polymerization after storage for a long time or immediately after preparation.

The solid component II of this invention is powder having a specific surface area of 0.5 to 650 m$^2$/g as measured by BET method at the adsorption temperature of liquid nitrogen, and having an average pore radius of 5 to 40 A. It is composed of 0.2 to 20 wt % of magnesium atom, 0.02 to 15 wt % of titanium atom, 1 to 65 wt % of halogen atom, 0.001 to 20 wt % of aluminum atom, and organic compounds. In the case where contacting with an olefin is performed, the solid component II contains 1 to 90 wt % of olefin polymer.

Catalyst for Polymerization of Olefin

The catalyst component of this invention is combined with an organoaluminum compound to be made into a catalyst for homopolymerization of an olefin or for copolymerization of an olefin and other olefin.

Organoaluminum Compound

The organoaluminum compound to be combined with the catalyst component for olefin polymerization may be selected from the above-mentioned compounds used for the preliminary treatment of the solid component. Preferable among them is trialkyl aluminum, particularly triethyl aluminum and triisobutyl aluminum. This trialkyl aluminum may be used in combination with other organoaluminum compounds such as commercially available diethyl aluminum chloride, ethyl aluminum dichloride, ethyl aluminum sesquichloride, diethyl aluminum ethoxide, diethyl aluminum hydride, or a mixture thereof or a complex thereof.

The organoaluminum compound may be used alone or in combination with an electron donor compound. The electron donor compound may be the same compound as used for the treatment of the solid component.

The electron donor compound may be used when an organoaluminum compound is used in combination with the catalyst component, or may be used after being contacted with an organoaluminum beforehand.

The organoaluminum compound is used in an amount of 1 to 2000 gram mol, preferably 20 to 500 gram mol, for 1 gram atom of titanium in the catalyst component of this invention.

The organoaluminum compound is used in an amount of 0.1 to 40 gram atom, preferably 1 to 25 gram atom, in terms of aluminum in the organoaluminum compound, for 1 mole of the electron donor compound.

Polymerization of Olefin

The catalyst composed of the catalyst component prepared as mentioned above and an organoaluminum compound (and an electron donor compound) is useful as a catalyst for homopolymerization of ethylene, propylene, 1-butene, 4-methyl-1-pentene, 1-hexene, and 1-octene and copolymerization of such an olefin and other mono-olefin or diolefin. It exhibits outstanding performance as a catalyst for homopolymerization of ethylene and for random or block copolymerization of ethylene and an alpha-olefin of carbon number 3 to 10, such as propylene, 1-butene, 4-methyl-1-pentene, 1-hexene, and 1-octene.

The polymerization may be performed either in gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in the liquid monomer. The polymerization temperature is usually −80° C. to 150° C., preferably 40° C. to 120° C. The polymerization pressure is 1 to 60 atm. The molecular weight modification of the resulting polymer is accomplished in the presence of hydrogen or other known molecular weight modifiers. In the copolymerization of olefin, the quantity of other olefin to be copolymerized is usually less than 30 wt %, particularly 0.5 to 15 wt %, based on the olefin. The polymerization with the catalyst system of this invention may be performed continuously or batchwise under the commonly used conditions. The copolymerization may be accomplished in one step or in two or more steps.

Effect of Invention

When the catalyst component of this invention is used for homopolymerization of olefin, particularly ethylene, or for copolymerization of ethylene and other olefin, it exhibits a high catalytic activity and produces a marked effect on the molecular weight modification. Therefore, it provides polymers having a high melt index, polymers with improved pellet properties, and polymers having a high bulk density. Moreover, the catalyst keeps high catalytic activity even under high hydrogen partial pressure.

In the copolymerization of ethylene and alpha-olefin, the catalyst component of this invention exhibits good performance and provides low-density copolymer in high yields which has a high bulk density and low solubility in solvents.

Examples

The invention is described in more detail with reference to the following examples and application examples. The scope of this invention is not limited by the examples. Percent (%) in the examples and application examples means wt %, unless otherwise indicated.

The specific surface area (S.A.), pore volume (P.V.), and mean pore radius (M.P.R.) of the solid component were measured by using SORPTOMATIC, Model 1810, made by CARLO ERBA. The particle size distribution of the solid component and catalyst component was measured with a phototransmission type particle size distribution meter, Model SKN 500, (a product of Seishin Kigyo Co., Ltd.)

The melt index (MI) of the polymer was measured at 190° C. and under a load of 2.16 kg according to ASTM-D1238. The flow ratio (FR) is a quotient obtained by dividing the value (HLMI) by the value (MI), where HLMI is measured at 190° C. under a load of 21.6 kg and MI is measured at 190° C. under a load of 2.16 kg. It represents the flow ratio of a polymer which is a measure of molecular weight distribution of a polymer. The n-hexane soluble (nHS), which indicates the low molecular weight fraction in a polymer, is the ratio of polymer extracted for 5 hours by boiling n-hexane in a Soxhlet apparatus of improved type.

The olefin contact quantity is the quantity (g) of polymer formed per 1 g of the solid component before contact with olefin. The quantity of polymer was determined by contacting the catalyst component with 2N $H_2SO_4$ aqueous solution and ethanol to separate the solid component from the polymer, washing the separated polymer with ethanol, and weighing the polymer after vacuum drying at 70° C. for 10 hours.

The catalytic activity Kpc is the quantity (g) of polymer formed per 1 g of the catalyst component. The solid component activity Kc is the quantity (g) of polymer formed per 1 g of solid component as measured before contact with olefin. The specific activity denotes the quantity (g) of polymer formed per 1 g of solid component as measured before contact with olefin, per 1 hour of polymerization time, and per 1 kg/cm² of monomer partial pressure in polymerization.

EXAMPLE 1

Contacting of magnesium diethoxide, hexachloroethane, and ethyl benzoate with one another:

85 g of commercial magnesium diethoxide and 79 g of hexachloroethane [$C_2Cl_6/Mg(OEt)_2 = 0.45$ molar ratio] were placed in a 1-liter stainless steel (SUS 316) mill pot containing 340 pieces of stainless steel (SUS 316) balls, 12 mm in diameter. The mill pot was mounted on a shaker and shaked for 15 hours to accomplish copulverizing. Copulverizing was further continued for 15 hours with the addition of 12 g of ethyl benzoate. Thus there was obtained a pulverized product.

Treatment with titanium tetrachloride:

10 g of the pulverized product obtained in the above step was placed in a 300 cc flask under the nitrogen atmosphere. To the flask were added 100 ml of toluene and 50 ml of titanium tetrachloride, with stirring at 95° C. for 2 hours to accomplish contacting. After removal of excess liquid, the solid substance was washed 6 times with 150 ml portions of n-hexane at 65° C. and then dried at 50° C. under reduced pressure for 1 hour. Thus there was obtained the solid component (1) containing 16.2% of magnesium, 54.6% of chlorine, 5.4% of titanium, and 10.1% of ethyl benzoate. The solid component had a specific surface area of 411 m²/g, a pore volume of 0.27 cc/g, and an average pore radius of 11.9 Å.

EXAMPLE 2

Example 1 was repeated to obtain the solid component (2), except that the order of contacting was changed as follows: magnesium diethoxide was contacted with ethyl benzoate, and the contact product was then contacted with hexachloroethane. The solid component had the composition and physical properties as shown in Table 1.

EXAMPLE 3

A contact product of magnesium diethoxide and hexachloroethane was obtained in the same manner as in Example 1. 10 g of this contact product was placed in a 300 cc flask under the nitrogen atmosphere. To the flask were added 100 ml of toluene and 50 ml of titanium tetrachloride with stirring at 95° C. for 2 hours to accomplish contacting. After removal of excess liquid, the solid substance was washed 6 times with 150 ml portions of n-hexane at 65° C. To this washed solid were added 0.3 g of ethyl benzoate and 150 ml of n-hexane with stirring at 50° C. for 2 hours. The contact product was washed 4 times with 150 ml portions of n-hexane and then dried at 50° C. under reduced pressure for 1 hour. Thus there was obtained the solid component (3). The solid component had the composition and physical properties as shown in Table 1.

EXAMPLE 4

A contact product of magnesium diethoxide and hexachloroethane was obtained in the same manner as in Example 1. 10 g of this contact product was placed in a 300 cc flask under the nitrogen atmosphere. To the flask were added 100 ml of toluene and 0.6 g of ethyl benzoate with stirring at 65° C. for 2 hours to accomplish contacting. After removal of excess liquid, the solid substance was washed twice with 150 ml portions of toluene. Subsequently, treatment with titanium tetrachloride was performed in the same manner as in Example 1. Thus there was obtained the solid component (4). The solid component (4) had the composition and physical properties as shown in Table 1.

EXAMPLES 5 TO 8

Solid components (5) to (8) were obtained in the same manner as in Example 1, except that ethyl benzoate was replaced by the following electron donor compounds. Each solid component had the composition and physical properties as shown in Table 1.

| Example | Electron Donor Compound |
|---|---|
| 5 | Ethyl p-anisate |
| 6 | Methyl p-toluate |
| 7 | Di-n-butyl ether |
| 8 | Tetrahydrofuran |

COMPARATIVE EXAMPLE 1

Magnesium diethoxide alone was placed in the same mill pot as used in Example 1, and the mill pot was shaked for 15 hours. The resulting crushed product was contacted with titanium tetrachloride in the presence of toluene in the same manner as in Example 1. The resulting contact product was treated in the same manner as in Example 1. Thus there was obtained a solid substance. This solid substance had the composition and physical properties as shown in Table 1.

COMPARATIVE EXAMPLE 2

160 g of magnesium diethoxide and 20 g of ethyl benzoate were placed in the same mill pot as used in Example 1, and the mill pot was shaked for 15 hours. The resulting crushed product (mostly in the form of lump) was contacted with titanium tetrachloride in the presence of toluene in the same manner as in Example 1. The resulting contact product was treated in the same manner as in Example 1. Thus there was obtained a solid substance. This solid substance had the composition and physical properties as shown in Table 1.

EXAMPLE 9

Contacting with an organoaluminum compound:

5 g of the solid component (1) obtained in Example 1 was placed in a 200 cc flask under the nitrogen atmosphere and made into a slurry by adding 100 cc of n-heptane. To this slurry was added dropwise 6.0 mmol of triethyl aluminum over 1 hour with stirring at room temperature. Stirring was continued for 2 hours. After removal of supernatant liquid, the solids were washed 4 times with 100 ml portions of n-hexane, followed by drying. Thus there was obtained the solid component (9). The solid component (9) had the composition and physical properties as shown in Table 1.

EXAMPLE 10

The solid component (10) was obtained in the same manner as in Example 9, except that 5 g of the solid component (7) obtained in Example 7 was used and triethylaluminum was replaced by 8.0 mmol of diethylaluminum chloride. This solid component had the composition and physical properties as shown in Table 1.

EXAMPLE 11

The solid component (11) was obtained in the same manner as in Example 9, except that triethylaluminum was replaced by 6.0 mmol of complex (1:1) of diethylaluminum chloride and di-n-butyl ether. This solid component had the composition and physical properties as shown in Table 1.

EXAMPLE 12

5 g of the solid component (3) obtained in Example 3 was placed in a 300 cc flask under the nitrogen atmosphere and made into a slurry by adding 150 cc of n-hexane. To this slurry was added dropwise 1.2 mmol of triisobutyl-aluminum over 2 hours with stirring at room temperature. Stirring was continued for 1 hour. Ethylene was introduced with stirring at room temperature under normal pressure, so that 1 g of solid component (3) is contacted with 0.3 g of ethylene. After removal of supernatant liquid, the solids were washed 4 times with 150 ml portions of n-hexane, followed by drying. Thus there was obtained the solid component (12). This solid component had the composition and physical properties as shown in Table 1. This solid component contained 22% of ethylene polymer.

The average particle diameter of solid components (3) and (12) was 9.9$\mu$ and 13.8$\mu$, respectively. The average particle size of solid component (3) reduced to 7.6 $\mu$ when it was contacted with triisobutylaluminum at 85° C. in the same manner as in olefin polymerization [Al/Ti=150 (atomic ratio)]. However, the average particle size of solid component (12) changed little (13.5$\mu$) when it was contacted with triisobutylaluminum in the same manner as above.

TABLE 1

| | Solid component | Composition (%) | | | | | | Physical properties | | |
| | | Content of magnesium | Content of chlorine | Content of titanium | Content of aluminum | Electron donor compond | | S.A. (m²/g) | P.V. (cc/g) | M.P.R. (Å) |
| | | | | | | Kind of compound | Content | | | |
|---|---|---|---|---|---|---|---|---|---|---|
| Example | | | | | | | | | | |
| 1 | (1) | 16.2 | 54.6 | 5.4 | — | Ethyl benzoate | 10.1 | 411 | 0.27 | 11.9 |
| 2 | (2) | 16.0 | 55.1 | 5.8 | — | Ethyl benzoate | 10.5 | 436 | 0.30 | 13.0 |
| 3 | (3) | 14.8 | 57.3 | 7.2 | — | Ethyl benzoate | 3.6 | 508 | 0.33 | 13.2 |
| 4 | (4) | 16.9 | 56.8 | 6.1 | — | Ethyl benzoate | 7.6 | 420 | 0.29 | 12.7 |
| 5 | (5) | 15.2 | 53.8 | 6.0 | — | Ethyl p-anisate | 13.1 | 452 | 0.33 | 11.8 |
| 6 | (6) | 16.3 | 54.1 | 5.2 | — | Ethyl p-toluate | 12.6 | 426 | 0.29 | 12.8 |
| 7 | (7) | 13.8 | 56.4 | 8.1 | — | n-Butyl ether | 9.6 | 508 | 0.34 | 13.5 |
| 8 | (8) | 13.9 | 54.9 | 7.6 | — | Tetrahydrofuran | 9.2 | 466 | 0.32 | 12.6 |
| 9 | (9) | 14.1 | 47.4 | 4.7 | 2.4 | Ethyl benzoate | 8.0 | 158 | 0.15 | 23.2 |
| 10 | (10) | 11.7 | 47.6 | 6.8 | 3.3 | n-Butyl ether | 7.7 | 170 | 0.17 | 18.8 |
| 11 | (11) | 12.8 | 43.6 | 4.3 | 2.8 | Ethyl benzoate | 7.1 | 68 | 0.09 | 22.6 |
| | | | | | | n-Butyl ether | 10.3 | | | |
| 12 | (12) | 9.6 | 42.0 | 4.8 | 1.9 | Ethyl benzoate | 2.7 | 2.5 | 0.01 | 28.7 |
| Compar- | | | | | | | | | | |

TABLE 1-continued

| Solid component | Composition (%) | | | | | | Physical properties | | |
|---|---|---|---|---|---|---|---|---|---|
| | Content of magnesium | Content of chlorine | Content of titanium | Content of aluminum | Electron donor compond Kind of compound | Content | S.A. (m²/g) | P.V. (cc/g) | M.P.R. (Å) |
| ative | | | | | | | | | |
| 1 | (1) | 11.9 | 53.8 | 7.8 | — | — | — | 180 | 0.16 | 15.0 |
| 2 | (2) | 15.1 | 53.6 | 6.9 | — | Ethyl benzoate | 14.1 | 206 | 0.18 | 15.2 |

APPLICATION EXAMPLE 1

Copolymerization of ethylene and 1-butene:

Into a 1.5-liter stainless steel (SUS 316) autoclave equipped with a stirrer were charged under the nitrogen atmosphere 10.1 mg of the solid component obtained in Example 1, 0.7 mmol of triisobutyl aluminum, and 700 ml of isobutane, and the polymerization system was heated to 80° C. Hydrogen was introduced until the hydrogen partial pressure reached 1.2 kg/cm² and then ethylene was introduced until the ethylene partial pressure reached 3 kg/cm², and finally 20 g of 1-butene was added. Polymerization was carried out for 1 hour, while ethylene was supplied continuously so that the total pressure of the polymerization system was kept constant. After the polymerization was complete, the solvent and unreacted ethylene and 1-butene were purged from the polymerization system. White powdery polymer was discharged and dried at 70° C. under reduced pressure for 10 hours. Thus there was obtained 181 g of ethylene-1-butene copolymer having an MI of 1.7, an FR of 27, a bulk density of 0.37 g/cc, and a true density of 0.925 g/cc. (Specific catalytic activity: 5,960) The n-hexane soluble (nHS) of the polymer was 2.8%.

APPLICATION EXAMPLES 2 TO 14

Copolymerization of ethylene and alpha-olefin:

Copolymerization of ethylene was carried out in the same manner as in Application Example 1 using as the catalyst component the solid components obtained in Examples 2 to 12 and Comparative and Comparative Examples 1 and 2, except that the kind and quantity of comonomer and the partial pressure of hydrogen were changed as shown in Table 2. The polymerization conditions and the results of polymerization are shown in Table 2. It is noted that in the case where the catalyst components of this invention are used, the catalytic activity is higher, the bulk density of polymer is higher, the density of polymer is lower, and the solvent solubles are less than in the case where the catalyst components obtained in Comparative Examples are used.

APPLICATION EXAMPLES 15 TO 18

Polymerization of ethylene:

Polymerization of ethylene was carried out at 85° C. in the same manner as in Application Example 1, except that 1-butene was not used. The solid components obtained in Examples 1, 3, 7, and 12 were used as the catalyst components. The results are shown in Table 2. The solid component (12) which had been treated with an organoaluminum compound and olefin provided a polymer having an average particle diameter of 305 μ and containing less than 7% of powder finer than 150 mesh. In the case where the solid component (3) which had not been treated was used, the resulting polymer had an average particle diameter of 240 μ and contained 18% of powder finer than 150 mesh.

TABLE 2

| Application Example | Catalyst component | α-olefin Kind | Q'ty (g) | Hydrogen partial pressure (kg/cm²) | Kc | Specific activity | MI (g/10 min) | FR | Bulk density (g/cc) | True density (g/cc) | nHS (%) |
|---|---|---|---|---|---|---|---|---|---|---|---|
| 2 | (2) | 1-Hexene | 30 | 1.2 | 15,840 | 5,080 | 1.8 | 26 | 0.33 | 0.927 | 3.9 |
| 3 | (3) | 1-Butene | 20 | 2.0 | 14,550 | 4,850 | 10.5 | 26 | 0.34 | 0.932 | 6.5 |
| 4 | (4) | 1-Butene | 25 | 1.0 | 18,030 | 6,010 | 1.3 | 27 | 0.35 | 0.924 | 3.4 |
| 5 | (5) | 1-Butene | 20 | 1.2 | 18,390 | 6,130 | 2.5 | 27 | 0.33 | 0.927 | 3.5 |
| 6 | (6) | 1-Butene | 15 | 0.8 | 14,790 | 4,190 | 0.93 | 28 | 0.36 | 0.934 | 1.7 |
| 7 | (7) | 1-Hexene | 30 | 1.2 | 16,740 | 5,580 | 3.2 | 26 | 0.32 | 0.929 | 4.1 |
| 8 | (8) | 1-Butene | 25 | 1.5 | 15,540 | 5,180 | 3.5 | 27 | 0.34 | 0.926 | 4.9 |
| 9 | (9) | 1-Hexene | 40 | 0.8 | 19,620 | 6,540 | 0.89 | 26 | 0.37 | 0.923 | 3.0 |
| 10 | (10) | 1-Butene | 20 | 1.0 | 17,130 | 5,710 | 2.1 | 27 | 0.33 | 0.928 | 4.0 |
| 11 | (11) | 1-Butene | 25 | 0.8 | 18,210 | 6,070 | 0.72 | 28 | 0.35 | 0.922 | 2.7 |
| 12 | (12) | 1-Butene | 20 | 1.2 | *1 | 5,630 | 1.9 | 27 | 0.37 | 0.926 | 3.1 |
| 13 | Comp. Ex. 1 | 1-Butene | 20 | 1.2 | 6,540 | 2,180 | 1.2 | 28 | 0.19 | 0.930 | 10.1 |
| 14 | Comp. Ex. 2 | 1-Butene | 20 | 1.2 | 6,990 | 2,330 | 1.4 | 27 | 0.26 | 0.928 | 7.3 |
| 15 | (1) | — | — | 1.2 | 15,780 | 5,260 | 0.88 | 32 | 0.35 | — | 0.20 |
| 16 | (3) | — | — | 1.2 | 10,950 | 3,650 | 0.77 | 31 | 0.34 | — | 0.25 |
| 17 | (7) | — | — | 1.2 | 18,030 | 6,010 | 1.02 | 32 | 0.35 | — | 0.26 |
| 18 | (12) | — | — | 1.2 | *2 | 5,780 | 0.83 | 32 | 0.34 | — | 0.27 |

Note to Table 2:
*1 Kc = 16,890 Kpc = 11,820
*2 Kc = 17,340 Kpc = 12,140

APPLICATION EXAMPLE 19

Into the same autoclave as used in Application Example 1 were charged under the nitrogen atmosphere 11.0 mg of the solid component (as catalyst component) obtained in Example 1, 0.7 mmol of triisobutyl aluminum, and 700 ml of isobutane, and the polymerization system was heated to 75° C. Hydrogen was introduced until the hydrogen partial pressure reached 0.2 kg/cm² and then ethylene was introduced until the ethylene partial pressure reached 3.0 kg/cm², and finally 30 g of 1-butene was added. Polymerization was carried out for 15 minutes, while ethylene was supplied continuously so that the total pressure of the polymerization system was kept constant. Then, hydrogen was introduced until the hydrogen partial pressure reached 6.0 kg/cm$^2$, and 20 g of 1-butene was added. Polymerization was further carried out for 60 minutes while ethylene was supplied continuously so that the total pressure of the polymerization system was kept constant. After the polymerization was complete, the same steps as in Application Example 1 were taken. Thus there was obtained 170 g of powdery ethylene-1-butene copolymer having an MI of 0.52, an FR of 85, a bulk density of 0.34 g/cc, and a true density of 0.928 g/cc. (Kc: 15450, and Specific activity: 4120).

EXAMPLE 13

Contacting of magnesium diethoxide, magnesium chloride, hexachloroethane, and ethyl benzoate with one another:

58 g of commercial magnesium diethoxide and 48 g of anhydrous magnesium chloride were placed in a 1-liter stainless steel (SUS 316) mill pot containing 340 pieces of stainless steel (SUS 316) balls, 12 mm in diameter. The mill pot was mounted on a shaker and shaked for 4 hours to accomplish copulverizing. Copulverizing was continued for 15 hours with the addition of 32 g of hexachloroethane. [Mg(OC$_2$H$_5$)$_2$/MgCl$_2$/C$_2$Cl$_6$ (molar ratio)=1/1/0.24] Copulverizing was further continued for 15 hours with the addition of 15 g of ethyl benzoate. Thus there was obtained a pulverized product.

Treatment with titanium tetrachloride:

10 g of the pulverized product obtained in the above step was placed in a 300 cc flask under a nitrogen atmosphere. To the flask were added 100 ml of toluene and 50 ml of titanium tetrachloride, with stirring at 95° C. for 2 hours to accomplish contacting. After removal of excess liquid, the solid substance was washed 6 times with 150 ml portions of n-hexane at 65° C. and then dried at 50° C. under reduced pressure for 1 hour. Thus there was obtained the solid component (13). The solid component had the composition and physical properties as shown in Table 3.

EXAMPLE 14

Example 13 was repeated to obtain the solid component (14), except that the order of contacting was changed as follows: The contact product of magnesium diethoxide and magnesium chloride was contacted with ethyl benzoate and then with hexachloroethane. The solid component had the composition and physical properties as shown in Table 3.

EXAMPLE 15

A contact product of magnesium diethoxide, magnesium chloride, and hexachloroethane was obtained in the same manner as in Example 13. 10 g of this contact product was placed in a 300 cc flask under the nitrogen atmosphere. To the flask were added 100 ml of toluene and 50 ml of titanium tetrachloride with stirring at 95° C. for 2 hours to accomplish contacting. After removal of excess liquid, the solid substance was washed 6 times with 150 ml portions of n-hexane at 65° C. To this washed solid were added 0.3 g of ethyl benzoate and 150 ml of n-hexane with stirring at 50° C. for 2 hours. The contact product was washed 4 times with 150 ml portions of n-hexane and then dried at 50° C. under reduced pressure for 1 hour. Thus there was obtained the solid component (15). The solid component had the composition and physical properties as shown in Table 3.

EXAMPLE 16

A contact product of magnesium diethoxide, magnesium chloride, and hexachloroethane was obtained in the same manner as in Example 13. 10 g of this contact product was placed in a 300 cc flask under the nitrogen atmosphere. To the flask were added 100 ml of toluene and 0.6 g of ethyl benzoate with stirring at 65° C. for 2 hours to accomplish contacting. After removal of excess liquid, the solid substance was washed twice with 150 ml portions of toluene. Subsequently, treatment with titanium tetrachloride was performed in the same manner as in Example 13. Thus there was obtained the solid component (16). The solid component (16) had the composition and physical properties as shown in Table 3.

EXAMPLES 17 TO 20

Solid components (17) to (20) were obtained in the same manner as in Example 13, except that ethyl benzoate was replaced by the following electron donor compounds. Each solid component had the composition and physical properties as shown in Table 3.

| Example | Electron Donor Compound |
|---|---|
| 17 | Ethyl p-anisate |
| 18 | Methyl p-toluate |
| 19 | Di-n-butyl ether |
| 20 | Tetrahydrofuran |

COMPARATIVE EXAMPLE 3

Magnesium diethoxide alone was placed in the same mill pot as used in Example 13, and the mill pot was shaked for 15 hours. The resulting crushed product was contacted with titanium tetrachloride in the presence of toluene in the same manner as in Example 13. The resulting contact product was treated in the same manner as in Example 13. Thus there was obtained a solid substance. This solid substance had the composition and physical properties as shown in Table 3.

COMPARATIVE EXAMPLE 4

160 g of magnesium diethoxide and 20 g of ethyl benzoate were placed in the same mill pot as used in Example 13, and the mill pot shaked for 15 hours. The resulting crushed product (mostly in the form of lump) was contacted with titanium tetrachloride in the presence of toluene in the same manner as in Example 13. The resulting contact product was treated in the same manner as in Example 13. Thus there was obtained a solid substance. This solid substance had the composition and physical properties as shown in Table 3.

EXAMPLE 21

Contacting with an organoaluminum compound:

5 g of the solid component (13) obtained in Example 13 was placed in a 200 cc flask under the nitrogen atmosphere and made into a slurry by adding 100 cc of n-heptane. To this slurry was added dropwise 3.3 mmol of triethyl aluminum over 1 hour with stirring at room temperature. Stirring was continued for 2 hours. After removal of supernatant liquid, the solids were washed 4 times with 100 ml portions of n-hexane, followed by drying. Thus there was obtained the solid component (21). The solid component (21) had the composition and physical properties as shown in Table 3.

EXAMPLES 22

The solid component (22) was obtained in the same manner as in Example 21, except that 5 g of the solid component (19) obtained in Example 19 was used and triethylaluminum was replaced by 5.9 mmol of diethylaluminum chloride. This solid component had the composition and physical properties as shown in Table 3.

EXAMPLES 23

The solid component (23) was obtained in the same manner as in Example 9, except that triethylaluminum was replaced by 3.3 mmol of complex (1:1) of diethylaluminum chloride and di-n-butyl ether. This solid component had the composition and physical properties as shown in Table 3.

EXAMPLES 24

5 g of the solid component (15) obtained in Example 15 was placed in a 300 cc flask under the nitrogen atmosphere and made into a slurry by adding 150 cc of n-hexane. To this slurry was added dropwise 4.8 mmol of triisobutylaluminum over 2 hours with stirring at room temperature. Stirring was continued for 1 hour. Ethylene was introduced with stirring at room temperature under normal pressure, so that 1 g of solid component (15) is contacted with 0.3 g of ethylene. After removal of supernatant liquid, the solids were washed 4 times with 150 ml portions of n-hexane, followed by drying. Thus there was obtained the solid component (24). This solid component had the composition and physical properties as shown in Table 3. This solid component contained 22% of ethylene polymer.

The average particle diameter of solid components (15) and (24) was 11.3µ and 14.5µ, respectively. The average particle size of solid component (15) reduced to 8.2µ when it was contacted with triisobutylaluminum at 85° C. in the same manner as in olefin polymerization [Al/Ti=150 (atomic ratio)]. However, the average particle size of solid component (24) changed little (14.0µ) when it was contacted with triisobutylaluminum in the same manner as above.

atmosphere 10.2 mg of the solid component (as catalyst component) obtained in Example 1, 0.7 mmol of triisobutyl aluminum, and 700 ml of isobutane, and the polymerization system was heated to 80° C. Hydrogen was introduced until the hydrogen partial pressure reached 1.2 kg/cm$^2$ and then ethylene was introduced until the ethylene partial pressure reached 3 kg/cm$^2$, and finally 20 g of 1-butene was added. Polymerization was carried out for 1 hour, while ethylene was supplied continuously so that the total pressure of the polymerization system was kept constant. After the polymerization was complete, the solvent and unreacted ethylene and 1-butene were purged from the polymerization system. White powdery polymer was discharged and dried at 70° C. under reduced pressure for 10 hours. Thus there was obtained 144 g of ethylene-1-butene copolymer having an MI of 3.8, an FR of 26, a bulk density of 0.38 g/cc, and a true density of 0.925 g/cc. (Specific catalytic activity: 4,690) The n-hexane soluble (nHS) of the polymer was 3.0%.

APPLICATION EXAMPLES 21 TO 33

Copolymerization of ethylene and alpha-olefin:

Copolymerization of ethylene was carried out in the same manner as in Application Example 20 using as the catalyst component the solid components obtained in Examples 13 to 24 and Comparative Examples 3 and 4, except that the kind and quantity of comonomer and the partial pressure of hydrogen were changed as shown in Table 4. The polymerization conditions and the results of polymerization are shown in Table 4. It is noted that in the case where the catalyst components of this invention are used the bulk density of polymer is higher, the density of polymer is lower, and the solvent solubles are less than in the case where the catalyst components obtained in Comparative Examples are used.

APPLICATION EXAMPLES 34 TO 37

Polymerization of ethylene:

Polymerization of ethylene was carried out at 85° C. in the same manner as in Application Example 20, except that 1-butene was not used. The solid components

TABLE 3

| | | Composition (%) | | | | Electron donor compound | | Physical properties | | |
|---|---|---|---|---|---|---|---|---|---|---|
| | Solid component | Content of magnesium | Content of chlorine | Content of titanium | Content of aluminum | Kind of compound | Content | S.A. (m$^2$/g) | P.V. (cc/g) | M.P.R. (Å) |
| Example | | | | | | | | | | |
| 13 | (13) | 18.8 | 57.3 | 3.2 | — | Ethyl benzoate | 9.4 | 316 | 0.27 | 12.6 |
| 14 | (14) | 18.2 | 57.0 | 3.0 | — | Ethyl benzoate | 10.0 | 327 | 0.27 | 13.2 |
| 15 | (15) | 19.1 | 57.6 | 4.6 | — | Ethyl benzoate | 3.0 | 322 | 0.28 | 11.6 |
| 16 | (16) | 18.7 | 56.8 | 4.4 | — | Ethyl benzoate | 5.3 | 383 | 0.30 | 11.9 |
| 17 | (17) | 17.9 | 57.2 | 3.8 | — | Ethyl p-anisate | 12.0 | 360 | 0.30 | 13.0 |
| 18 | (18) | 18.3 | 56.6 | 3.3 | — | Ethyl p-toluate | 11.6 | 290 | 0.26 | 12.1 |
| 19 | (19) | 18.5 | 56.3 | 4.8 | — | n-Butyl ether | 8.9 | 393 | 0.31 | 11.9 |
| 20 | (20) | 17.5 | 57.1 | 4.3 | — | Tetrahydrofuran | 8.1 | 344 | 0.29 | 12.2 |
| 21 | (21) | 17.0 | 52.3 | 3.0 | 1.7 | Ethyl benzoate | 8.3 | 98 | 0.10 | 23.2 |
| 22 | (22) | 14.7 | 48.2 | 3.6 | 1.8 | n-Butyl ether | 4.0 | 120 | 0.11 | 19.0 |
| 23 | (23) | 14.9 | 45.8 | 2.5 | 1.6 | Ethyl benzoate n-Butyl ether | 4.8 7.5 | 63 | 0.08 | 20.8 |
| 24 | (24) | 12.3 | 38.1 | 3.0 | 1.6 | Ethyl benzoate | 1.9 | 3.6 | 0.01 | 27.8 |
| Comparative | | | | | | | | | | |
| 3 | | 11.9 | 53.8 | 7.8 | — | — | — | 180 | 0.16 | 15.0 |
| 4 | | 15.1 | 53.6 | 6.9 | — | Ethyl benzoate | 14.1 | 206 | 0.18 | 15.2 |

APPLICATION EXAMPLE 20

Copolymerization of ethylene and 1-butene:

Into a 1.5-liter stainless steel (SUS 316) autoclave equipped with a stirrer were charged under the nitrogen obtained in Examples 20, 22, 26 and 31 were used as the catalyst components. The results are shown in Table 4. The solid component (24) which had been treated with an organoaluminum compound and olefin provided a polymer having an average particle diameter of 350μ and containing less than 4% of powder finer than 150 mesh. In the case where the solid component (15) which had not been treated was used, the resulting polymer had an average particle diameter of 250μ and contained 16% of powder finer than 150 mesh.

APPLICATION EXAMPLE 38

Into the same autoclave as used in Application Example 20 were charged under the nitrogen atmosphere 10.2 mg of the solid component (as catalyst component) obtained in Example 20, 0.7 mmol of triisobutyl aluminum, and 700 ml of isobutane, and the polymerization system was heated to 75° C. Hydrogen was introduced until the hydrogen partial pressure reached 0.15 kg/cm$^2$ and then ethylene was introduced until the ethylene partial pressure reached 3.0 kg/cm$^2$, and finally 30 g of 1-butene was added. Polymerization was carried out for 15 minutes, while ethylene was supplied continuously so that the total pressure of the polymerization system was kept constant. Then, hydrogen was introduced until the hydrogen partial pressure reached 5.0 kg/cm$^2$, and 20 g of 1-butene was added. Polymerization was further carried out for 70 minutes while ethylene was supplied continuously so that the total pressure of the polymerization system was kept constant. After the polymerization was complete, the same steps as in Application Example 1 were taken. Thus there was obtained 167 g of powdery ethylene-1-butene copolymer having an MI of 0.68, an FR of 75, a bulk density of 0.35 g/cc, and a true density of 0.928 g/cc. (Kc: 16370, and Specific activity: 3870)

tacted with the halogenated hydrocarbon prior to or simultaneously with the titanium halide 2. The process in accordance with claim 9 wherein the magnesium dialkoxide is contacted with a magnesium halide prior to contact with the halogenated hydrocarbon, electron donor compound and titanium compound.

3. The process of claim 1 wherein the titanium containing solid catalyst component is contacted with an organoaluminum compound.

4. The process of claim 2 wherein the titanium containing solid catalyst component is contacted with an organolaluminum compound.

5. The process in accordance with claim 1 wherein the magnesium dialkoxide is contacted with a halogenated hydrocarbon, prior to contact with the titanium halide compound.

6. The process in accordance with claim 1 wherein the magnesium dialkoxide is copulverized with the halogenated hydrocarbon, the solid product therefrom copulverized with the electron donor and the solid product therefrom contacted with the titanium halide compound.

7. The process in accordance with claim 1 wherein the magnesium dialkoxide is copulverized with magnesium dichloride prior to contact with the halogenated hydrocarbon.

8. The process in accordance with claim 1 wherein the halogenated hydrocarbon is selected from the group consisting of of 1,2-dichlorethane, 1,1,2-trichlorethane, 1,1,2-trichlorethylene, 1,1,2,2-tetrachloroethane, 1,2,2,2-tetrachlorethane, pentachloroethane, hexachlo-

TABLE 4

| Application Example | Catalyst component | α-olefin Kind | α-olefin Q'ty (g) | Hydrogen partial pressure (kg/cm$^2$) | Kc | Specific activity | MI (g/10 min) | FR | Bulk density (g/cc) | True density (g/cc) | nHS (%) |
|---|---|---|---|---|---|---|---|---|---|---|---|
| 20 | (13) | 1-Butene | 20 | 1.2 | 14,070 | 4,690 | 3.8 | 26 | 0.38 | 0.925 | 3.0 |
| 21 | (14) | 1-Hexene | 30 | 1.0 | 12,750 | 4,250 | 1.9 | 26 | 0.35 | 0.929 | 3.2 |
| 22 | (15) | 1-Butene | 20 | 1.0 | 15,030 | 5,010 | 1.5 | 27 | 0.36 | 0.926 | 3.5 |
| 23 | (16) | 1-Butene | 25 | 1.0 | 13,560 | 4,520 | 2.8 | 26 | 0.36 | 0.923 | 4.1 |
| 24 | (17) | 1-Butene | 20 | 0.8 | 14,430 | 4,810 | 0.98 | 27 | 0.37 | 0.926 | 1.9 |
| 25 | (18) | 1-Butene | 15 | 2.0 | 12,270 | 4,090 | 15.8 | 26 | 0.35 | 0.936 | 5.2 |
| 26 | (19) | 1-Hexene | 20 | 0.8 | 15,780 | 5,260 | 0.82 | 27 | 0.36 | 0.938 | 1.6 |
| 27 | (20) | 1-Butene | 25 | 1.0 | 13,080 | 4,360 | 1.7 | 27 | 0.36 | 0.924 | 4.2 |
| 28 | (21) | 1-Hexene | 40 | 1.0 | 15,120 | 5,040 | 2.2 | 27 | 0.37 | 0.924 | 3.8 |
| 29 | (22) | 1-Butene | 15 | 1.2 | 14,490 | 4,830 | 3.1 | 26 | 0.34 | 0.933 | 3.3 |
| 30 | (23) | 1-Butene | 25 | 1.0 | 13,440 | 4,480 | 1.6 | 27 | 0.38 | 0.925 | 3.0 |
| 31 | (24) | 1-Butene | 20 | 1.0 | *1 | 4,670 | 1.8 | 28 | 0.37 | 0.926 | 2.6 |
| 32 | Comp. Ex. 1 | 1-Butene | 20 | 1.2 | 6,540 | 2,180 | 1.2 | 28 | 0.19 | 0.930 | 10.1 |
| 33 | Comp. Ex. 2 | 1-Butene | 20 | 1.2 | 6,990 | 2,330 | 1.4 | 27 | 0.26 | 0.928 | 7.3 |
| 34 | (13) | — | — | 1.2 | 10,380 | 3,460 | 1.8 | 31 | 0.38 | — | 0.27 |
| 35 | (15) | — | — | 1.2 | 14,460 | 4,820 | 1.6 | 33 | 0.37 | — | 0.29 |
| 36 | (19) | — | — | 1.2 | 12,750 | 4,250 | 2.3 | 30 | 0.38 | — | 0.28 |
| 37 | (24) | — | — | 1.2 | *2 | 5,050 | 1.6 | 32 | 0.36 | — | 0.29 |

Note to Table 4:
*$^1$Kpc = 9,810 Kc = 14,010
*$^2$Kpc = 10,600 Kc = 15,150

What is claimed is:

1. A process for the polymerization of olefins which process comprises contacting under polymerization conditions an alphaolefin with a catalyst system comprising
   (a) an organoaluminum compound cocatalyst, and
   (b) a solid titanium containing catalyst component obtained by copulverizing a magnesium dialkoxide with a halogenated hydrocarbon having two or more carbon atoms, an electron donor compound and a tetravalent titanium halide compound with the proviso that the magnesium dialkoxide is conroethane, 1,2-dichloropropane, hexachloropropylene, octachloropropane, hexachlorobenzene.

9. The process in accordance with claim 1 wherein the magnesium dialkoxide is magnesium diethoxide, the halogenated hydrocarbon is hexachloroethane, the electron donor is ethyl benzoate and the titanium halide is titanium tetrachloride.

10. The process in accordance with claim 1 wherein the magnesium dialkoxide is magnesium diethoxide, the halogenated hydrocarbon is hexachloroethane, the electron donor is ethyl benzoate and the titanium halide compound is titanium tetrachloride.

11. The process in accordance with claim 1 wherein the contact product obtained by contacting the magnesium dialkoxide, halogenated hydrocarbon, electron donor and tetravalent titanium halide compound is further contacted with an organoaluminum compound in the ratio of 0.05 to 10 gram mol organoaluminum compound/gram atom Ti.

12. The process in accordance with claim 1 wherein the mol ratio of magnesium alkoxide to halogenated hydrocarbon is 1:0.1-20, the ratio of magnesium alkoxide to electron donor is 1:0.001-10 and the ratio of magnesium dialkoxide to titanium halide compound is 1 gram atom of magnesium to 0.1 gram mol or more of titanium halide compound.

13. The process in accordance with claim 1 wherein the organoaluminum compound cocatalyst is triisobutylaluminum.

* * * * *